No. 686,503. Patented Nov. 12, 1901.
N. S. BARGER.
STRADDLE ROW CULTIVATOR.
(Application filed July 30, 1901.)
(No Model.)
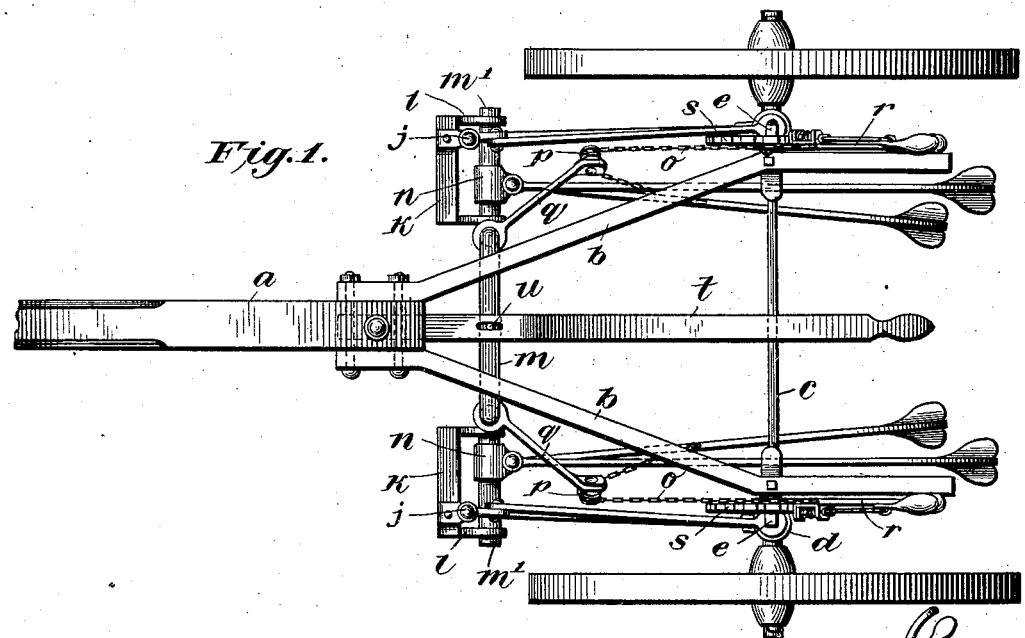
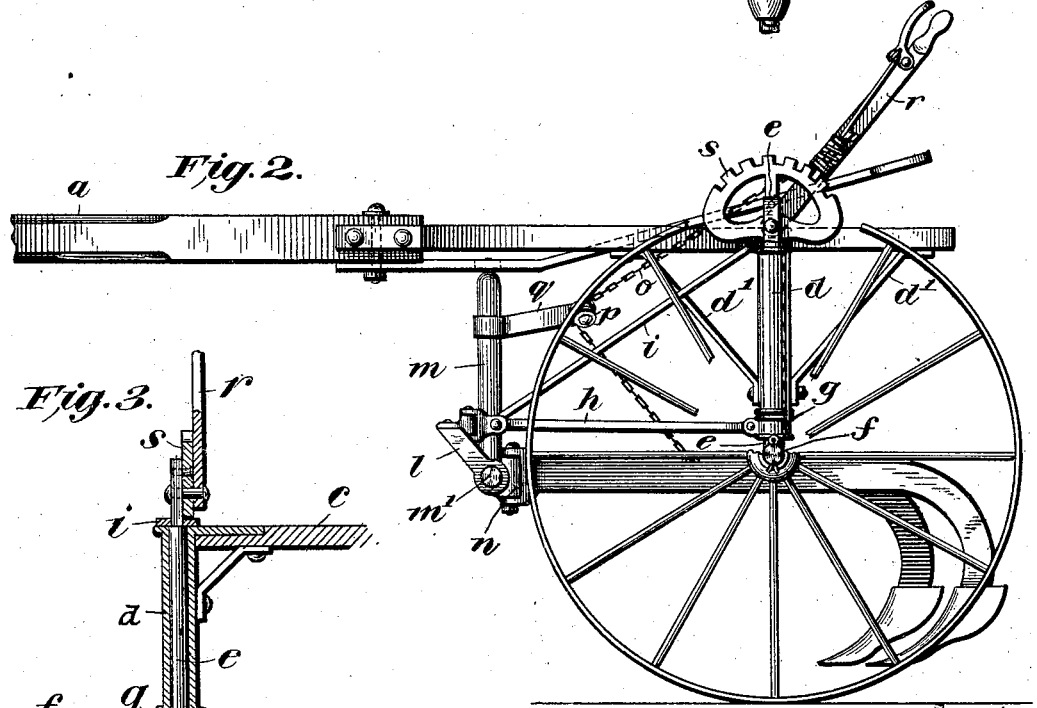
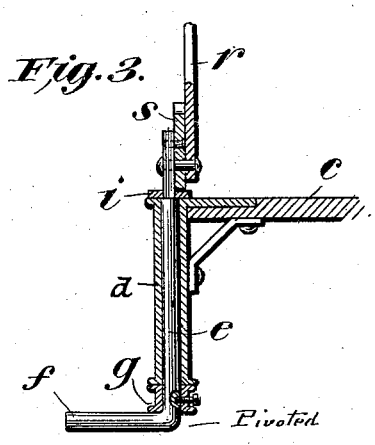
Witnesses
Elmer Seavey,
J. B. Glorius.
Inventor,
Nathaniel S. Barger.
By Davis & Davis,
Attorneys

UNITED STATES PATENT OFFICE.

NATHANIEL S. BARGER, OF ST. JOSEPH, MISSOURI.

STRADDLE-ROW CULTIVATOR.

SPECIFICATION forming part of Letters Patent No. 686,503, dated November 12, 1901.

Application filed July 30, 1901. Serial No. 70,234. (No model.)

*To all whom it may concern:*

Be it known that I, NATHANIEL S. BARGER, a citizen of the United States of America, residing at St. Joseph, in the county of Buchanan and State of Missouri, have invented certain new and useful Improvements in Cultivators, of which the following is a specification, reference being had therein to the accompanying drawings, in which—

Figure 1 is a plan view, and Fig. 2 a side elevation, of a cultivator constructed according to my invention; and Fig. 3 a vertical section of details hereinafter described.

This invention has reference to straddle-row riding-cultivators especially adapted for cultivating corn; and its object is to provide simple devices whereby the driver from his position on the seat may quickly and easily shift the direction of the machine as it passes along the row, so that the machine may be made to dodge such corn as may have been irregularly planted or bent to one side or the other of the row, and thereby effect a considerable saving, as more fully hereinafter set forth.

Referring to the drawings by letters, $a$ designates the tongue, rigidly connected by rearwardly-extending frame-bars $b$ to the cross-bar $c$, and $d$ a vertical tube rigidly depending from each end of said cross-bar $c$. Bars $d'$, extending between each tube and the adjacent frame-bar, serve to assist in bracing the tubes.

Journaled in and extending up through each of the tubular bearings $d$ is a rock-shaft $e$, whose lower end is turned outward and serves as an axle-spindle $f$ for one of the transporting-wheels. Rigidly secured to each shaft $e$ at a point just above the spindle is a collar $g$, which serves as a bearing for the lower end of tube $d$, and rigidly connected to said collar and extending forward therefrom is a horizontal rod $h$, to whose forward end is rigidly connected a brace-rod $i$, which extends upward and rearward and is connected rigidly to the rotative post or shaft $e$ at a point just above tube $d$.

Each triangular frame formed by rods $h$ and $i$ is connected at its forward end by a coupling $j$, having a vertical pivot, to the horizontal transverse bar $k$ of a bail $l$, which is rigidly secured to and extends upward and forward from one of the outward-extending arms $m'$ of an arch $m$. This arch extends transversely of the machine under the frame and is supported wholly upon the forward ends of the frames $h$ $i$.

Secured to each arm $m'$ of the arch between the side arms of the bail $l$ is the clip $n$ of one of the two cultivator-beams, and the lifting-chain $o$ of each beam or gang passes up over a pulley $p$, journaled on the upper outer end of an arm $q$, and thence to the lifting-lever $r$, which is pivotally supported on the projecting upper end of one of the rotative parts $e$ and is provided with a spring-pawl of the usual construction to engage a toothed sector $s$, secured rigidly to said post. Each arm $q$ is secured rigidly to one of the vertical parts of arch $m$ and extends outward and rearward therefrom to bring its roller or pulley in proper position with respect to the lever and the beam or gang.

Extending rearwardly from the pole is a pivoted lever $t$, which may be extended so as to be within convenient reach of the driver, wherever his seat may be placed. This lever extends back over the center of arch $m$ and is connected thereto by a pin $u$, projecting upward from the arch and extending through a longitudinal slot in the lever. The drivers' seat and the draft appliances are not shown, as they may be located and arranged in any suitable manner.

It will be observed that the tongue, bars $b$, cross-bars $c$, and the depending tubular sockets or bearings $d$, with their braces $d'$, form a rigid frame and that the remaining parts are so connected and arranged as to be movable in unison. The wheels being journaled on spindles carried by the posts or shafts $e$, and these shafts being connected by rigid frames pivotally to the arch, it will be observed that when the arch is shifted endwise in either direction by lever $t$ the wheels will be shifted obliquely to the line of draft to a corresponding extent, and thus change the direction of movement of the machine. Thus it will be seen that the machine will be very sensitive, enabling the driver to quickly and easily change its direction as it travels along over a row of corn, and thereby avoid breaking down such corn as may project into the path of the wheels.

Having thus fully described my invention, what I claim, and desire to obtain by Letters Patent, is—

1. In a straddle-row cultivator, the combination of a tongue-bearing frame connected thereto, a bearing-tube rigidly depending from said frame at each side, an upright shaft journaled in each of said tubes and carrying a wheel-spindle at its lower end, a wheel on each spindle, a rigid forwardly-extending frame connected to each of said shafts, an arch extending transversely of the machine and supported on the forward ends of said forwardly-extending frames and pivotally connected thereto, beam gangs connected to this arch, means for raising and lowering these gangs, and means for shifting the arch toward either side of the machine.

2. In combination with a tongue and a rearward-extending frame carrying a pair of rigidly-depending bearing-tubes, a vertical shaft journaled in each one of these tubes and carrying an axle-spindle at its lower end, a wheel on each of these spindles, a frame connected to each of these shafts and extending forward, a transverse arch provided with an upwardly-projecting bail at each end, means for pivotally connecting the forward-extending frames to the respective bails, means for shifting said arch endwise in either direction, a gang of cultivator-beams connected to each end of the arch between the side arms of the bail, and means for raising and lowering the cultivator-beams.

3. In combination, a tongue provided with a rearward-extending frame having a pair of depending bearing-tubes, one at each side of the machine, a vertical shaft journaled in each one of these tubes and extending up therethrough, each shaft carrying at its lower end a wheel-spindle and at its upper end a notched segment, a wheel on each spindle, a transverse arch and means for shifting it transversely of the machine, rigid frames carried by said upright shafts and pivotally connected to said arch, a gang of cultivator-beams connected to each end of the arch, an arm connected to the arch on each side of the machine and carrying a pulley, a lifting-chain connected to each gang and passing up over the adjacent one of the pulleys, and a lever connected to each of said chains and pivoted on the upper end of the adjacent one of the upright shafts and carrying means for engaging the notched segments.

In testimony whereof I hereunto affix my signature, in the presence of two witnesses, this 2d day of July, 1901.

NATHANIEL S. BARGER.

Witnesses:
M. C. POWELL,
JOHN F. PARNALL.